United States Patent Office 2,745,827
Patented May 15, 1956

2,745,827

STABILIZED TALL OIL AND METHOD OF MAKING SAME

Manton G. Bestul, North Charleston, S. C., assignor to West Virginia Pulp and Paper Company, New York, N. Y., a corporation of Delaware No Drawing. Application January 29, 1954, Serial No. 407,175

7 Claims. (Cl. 260—97.5)

My present invention relates to the stabilizing of tall oil against crystallization and to the tall oil so stabilized. Tall oil is a by-product of the pulping of pine wood by the sulfate or soda processes. It is a mixture principally of rosin and fatty acids and unsaponifiables such as sterols. The tall oil of commerce may be substantially as it is obtained by the acidification of the so-called tall oil skimmings, followed by drying, or it may be subjected to varying degrees of refinement as by acid treatment or by distillation, or by both such methods. When dealing with crude tall oil of commerce, the problem of the deposition of crystals of rosin acids upon standing, such acids having been dissolved in the fatty acid component, is particularly acute. Therefore when storing such tall oil it has been necessary to provide the storage tanks with heating coils so that the mixture may be heated, say to 100 or 150° F., in order that the crystals may be redissolved. If the storage tank is not provided with heating coils, it is necessary to withdraw the supernatant oil, heat it, and recirculate it until the crystals have been dissolved and a homogeneous oil is once more obtained. In the case of acid refined tall oil, the problem of the deposition of crystals is somewhat less acute because part of the rosin acids have been polymerized to uncrystallizable substances by the action of the concentrated sulfuric acid. When tall oil is distilled, the crystallization inhibitors are removed from the distilled product, thus enabling the rosin acids more readily to crystallize. In such a case it is a common practice to remove the crystallized rosin acids either by decantation or centrifuging. In other distillation methods employing fractionation, a fraction may be chosen rich in fatty acids whereby there is little tendency for the rosin acids to crystallize.

Therefore my invention is of particular usefulness as applied to crude tall oil but will apply to a lesser degree to the acid refined or distilled tall oils, especially when they contain more than 32% rosin acids.

I have now discovered that tall oil may be stabilized against crystallization by the formation in situ of amounts of tall oil soap on the order of 20%—say from 10–30% or more as required, such stabilized oil then being adapted for such purposes as require the tall oil to be saponified anyway. Among examples of such uses may be mentioned all forms of soaps, emulsifiers, cleaners, insecticides, asphalt emulsions, flotation agents, i. e., wherever the tall oil is to be treated with alkali. In all such instances, the so treated tall oil is shipped as a liquid. It may then be further treated either to form the whole soap or the free oil may be esterified to give a mixture of tall oil esters and soap.

In carrying out my improved method, I may use as the soap forming alkalies, the alkali metal hydroxides or carbonates, or soap forming oxides of the heavier metals such as calcium and zinc, e. g., lime or zinc oxide. When using the alkali metals as the soap forming agents, I preferably dissolve them in a small amount of water and add the solution to the oil to be treated. In any case after the soap forming agent has been added, the mixture is heated and agitated until substantially all the water, including that of the reaction, has been evaporated, i. e., until a homogeneous mixture is obtained and the moisture content is not over 1%.

My invention will be best understood by reference to the following specific examples.

*Example 1*

119 lbs. of crude tall oil containing 42% of rosin acids and having an acid number of 165 was heated to a temperature of 275° F. with stirring until all crystals had been dissolved. Thereupon 3.57 lbs. of sodium hydroxide dissolved in an equal weight of water was added and the stirring and heating continued for about one hour, at which time the moisture content had dropped to 0.2%. The product was a clear homogeneous solution having an acid number of 125, a Gardner-Holt viscosity of Z–4 to Z–5. The product, which contained about 25% of the acids in the form of soap, remained uncrystallizable for an indefinite period whereas the crude unstabilized tall oil deposited crystals within a few days.

*Example 2*

1000 lbs. of crude tall oil having a rosin acid content of 41–45% was heated to 275° F. and thereupon 44 lbs. of potassium hydroxide dissolved in an equal weight of water was added and the stirring and heating continued for one hour, at which time the stabilized product had an acid number of 125 and the Gardner-Holt viscosity was Z–1. The so treated tall oil, in which 26% of the acids were in the form of soap, remained homogeneous indefinitely, whereas the untreated oil threw down crystals of rosin acids within a week.

*Example 3*

2000 grams of once-distilled tall oil having a rosin acid content of 44% was reacted with 50 grams of calcium oxide CaO by adding the CaO and heating the mixture with stirring for a period of one hour, at which time the temperature had increased gradually to 300° F. and the moisture content was reduced to below 1%. The stabilized product had an acid number of 139 and a Gardner-Holt viscosity of Y to Z and contained 28% soap. It remained homogeneous indefinitely whereas the untreated oil threw out rosin acid crystals within a few days.

The temperature of the heating may vary as desired from 200 to 400° F. The amount of alkali needed will increase with increase in the amount of rosin acids present. In general, unless the acid number has been reduced to about 140 or below, there will be a tendency of the oil to crystallize. However, the acid number should not be carried to below 100 since the resulting mixture will have a viscosity so high as to make handling difficult. It has already been pointed out that the moisture content should be kept below 1%; otherwise some crystallization may occur. Otherwise expressed, the amount of alkali present in the stabilized oil will be from 2 to 5%, thus corresponding to approximately 10–30% soap in the stabilized material.

I claim:

1. The method of stabilizing tall oil against crystallization which comprises forming tall oil soap in situ in the approximate amount of 10–30% by weight as required by treating said tall oil with a soap-forming alkali and thereafter heating the tall oil so treated to render the moisture content less than about 1% but without reducing the acid number to below 100.

2. The method according to claim 1 in which the soap-forming alkali is sodium hydroxide.

3. The method according to claim 1 in which the soap-forming alkali is potassium hydroxide.

4. The method according to claim 1 in which the soap-forming alkali is lime.

5. The method according to claim 1 in which the alkali is added in the form of a concentrated aqueous solution.

6. A tall oil substantially free from rosin crystals and stabilized against the formation of such crystals upon storage, said stabilized oil containing about 10–30% soap and having an acid number of 100 or greater and being of clear and homogeneous appearance and substantially anhydrous.

7. A tall oil substantially free from rosin crystals and stabilized against formation of such crystals upon storage, containing about 10–30% soap, less than about 1% moisture, and having an acid number of about 100 or greater, obtained by treating tall oil with a soap-forming alkali in an amount sufficient to form said soap therein, and thereafter heating the tall oil so treated to attain said moisture content but without reducing the acid number to below about 100.

References Cited in the file of this patent
UNITED STATES PATENTS

| | | |
|---|---|---|
| 2,367,462 | Farber | Jan. 16, 1945 |
| 2,616,814 | Mahler | Nov. 4, 1952 |
| 2,675,325 | Dill | Apr. 13, 1954 |
| 2,680,694 | Barthel et al. | June 8, 1954 |